United States Patent
Ali et al.

(10) Patent No.: US 9,753,742 B2
(45) Date of Patent: *Sep. 5, 2017

(54) WEB-BASED INTERFACE TO ACCESS A FUNCTION OF A BASIC INPUT/OUTPUT SYSTEM

(71) Applicant: HEWLETT-PACKARD DEVELOPMENT COMPANY, L.P., Houston, TX (US)

(72) Inventors: Valiuddin Y. Ali, Cypress, TX (US); Jose Paulo Xavier Pires, Porto Alegre (BR); James M. Mann, Cypress, TX (US); Boris Balacheff, Lyons (FR); Chris I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,804

(22) Filed: Sep. 13, 2016

(65) Prior Publication Data
US 2017/0003980 A1  Jan. 5, 2017

Related U.S. Application Data

(63) Continuation of application No. 14/352,424, filed as application No. PCT/US2011/057263 on Oct. 21, 2011, now Pat. No. 9,448,810.

(51) Int. Cl.
*G06F 9/44* (2006.01)
*G06F 9/455* (2006.01)
*H04L 29/06* (2006.01)

(52) U.S. Cl.
CPC ........ *G06F 9/4416* (2013.01); *G06F 9/45558* (2013.01); *H04L 63/14* (2013.01);
(Continued)

(58) Field of Classification Search
CPC .......................... G06F 9/4416; G06F 9/45558
(Continued)

(56) References Cited

U.S. PATENT DOCUMENTS 6,081,664 A * 6/2000 Nowlin, Jr. ......... G06F 11/3466
713/2
7,213,152 B1   5/2007 Gafken et al.
(Continued)

FOREIGN PATENT DOCUMENTS

CN    1680920     10/2005
CN    101034994   9/2007
(Continued)

OTHER PUBLICATIONS http://phrack.org/issues/65/7.html, Phrack Magazine, Nov. 4, 2008 (27 pages).
(Continued)

*Primary Examiner* — Vincent Tran
(74) *Attorney, Agent, or Firm* — Trop, Pruner & Hu (57) ABSTRACT

In some examples, an electronic device receives, while an operating system is running in the electronic device, a request to access a function of a Basic Input/Output System (BIOS), the request containing a web address of the function of the BIOS, and routes, based on the web address of the function of the BIOS, the request through a web-based interface to a domain that includes the function of the BIOS.

20 Claims, 4 Drawing Sheets

(52) U.S. Cl.
CPC ............. *G06F 2009/45575* (2013.01); *G06F 2009/45579* (2013.01)

(58) Field of Classification Search
USPC .......................................................... 713/2
See application file for complete search history.

(56) References Cited

U.S. PATENT DOCUMENTS

| | | | |
|---|---|---|---|
| 7,676,666 B2 | 3/2010 | Lambert | |
| 7,797,707 B2 | 9/2010 | Cherkasova | |
| 7,809,985 B2 | 10/2010 | Chen et al. | |
| 7,925,802 B2 | 4/2011 | Lauterbach | |
| 7,987,353 B2 * | 7/2011 | Holdaway | G06F 9/44505 713/1 |
| 9,003,001 B2 | 4/2015 | Dvorkin | |
| 9,026,824 B2 * | 5/2015 | Davis | G06F 1/3203 713/323 |
| 9,129,103 B2 | 9/2015 | Wang et al. | |
| 9,448,810 B2 * | 9/2016 | Ali | G06F 9/45558 |
| 2005/0160159 A1 | 7/2005 | Zimmer | |
| 2005/0177710 A1 | 8/2005 | Rothman | |
| 2005/0198203 A1 | 9/2005 | Tsai | |
| 2006/0200819 A1 | 9/2006 | Cherkasova | |
| 2006/0200820 A1 | 9/2006 | Cherkasova | |
| 2007/0169076 A1 | 7/2007 | Desselle et al. | |
| 2008/0162914 A1 | 7/2008 | Adrangi et al. | |
| 2009/0177877 A1 | 7/2009 | Holdaway | |
| 2009/0193106 A1 | 7/2009 | Bouten et al. | |
| 2010/0037323 A1 | 2/2010 | Lemieux et al. | |
| 2010/0115315 A1 | 5/2010 | Davis et al. | |
| 2010/0122197 A1 | 5/2010 | Fujioka | |
| 2010/0161844 A1 | 6/2010 | Barde | |
| 2010/0174924 A1 | 7/2010 | Banga | |
| 2010/0199062 A1 * | 8/2010 | Sancho-Dominguez | G06F 1/3203 711/202 |
| 2010/0205420 A1 | 8/2010 | Chen et al. | |
| 2010/0287290 A1 | 11/2010 | Bramley et al. | |
| 2011/0035532 A1 | 2/2011 | Hall | |
| 2011/0047472 A1 * | 2/2011 | West | H04L 67/08 715/740 |
| 2011/0055823 A1 | 3/2011 | Nichols | |
| 2011/0072254 A1 | 3/2011 | Kuang | |
| 2011/0296409 A1 | 12/2011 | Lo | |
| 2014/0230078 A1 | 8/2014 | Graham | |
| 2014/0281469 A1 | 9/2014 | Ali | |
| 2014/0359259 A1 | 12/2014 | Ali | |

FOREIGN PATENT DOCUMENTS

| | | |
|---|---|---|
| CN | 101599022 | 2/2009 |
| CN | 100561923 C | 11/2009 |
| CN | 101751284 | 6/2010 |
| JP | 2000293474 | 10/2000 |
| JP | 2003525484 | 8/2003 |
| JP | 2006252554 | 9/2006 |
| JP | 2008112423 | 5/2008 |
| JP | 2009110518 | 5/2009 |
| JP | 2009145932 | 7/2009 |
| TW | 448406 | 8/2001 |
| TW | 200907804 | 2/2009 |
| WO | WO-2008149412 | 12/2008 |
| WO | WO-2012102725 | 8/2012 |

OTHER PUBLICATIONS http://smackerelofopinion.blogspot.com/2009/10/system-management-mode-is-evil.html, A Smackerel of Opinion: System Management Mode is Evil, Notes and jottings from an Ubuntu Kernel Engineer, Oct. 20, 2009 (6 pages).
Joanna Rutkowska, The Invisible Things Lab's blog, Kernel, Hypervisor, Virtualization, Trusted Computing and other system-level security stuff, Apr. 30, 2010 (34 pages).
U.S. Appl. No. 14/352,430, Non-Final Rejection dated Aug. 23, 2016, pp. 1-14 and attachments.
Wojtczuk et al., Attacking SMM Memory via Intel CPU Cache Poisoning, 2009 (6 pages).
Ali et al., International Appl. No. PCT/US2011/053587 entitled Unlocking a Storage Device filed Sep. 28, 2011 (31 page).
Dow et al., The Xen Hypervisor from Running Xen: A Hands-On Guide to the Art of Visualization, Apr. 2008 (4 pages).
http://www.trustedcomputinggroup.org, Commonly Asked Questions and Answers on Self-Encrypting Drives dated on or before Aug. 25, 2011 (7 pages).
M'Raihi et al., HOTP: A HMAC-Based One-Time Password Algorithm, Network Working Group, Requet for Comments: 4226, Dec. 2005 (38 pages).
PCT Search Report/Written Opinion—Application No. PCT/US2011/057263—dated May 30, 2012—9 pages.
Perenson, PCWorld, Self-Encrypted Drives Set to Become Standard Fare, Jan. 2011 (4 pages).
Sanders, Booting a VMWARE VM from CD, USB, or the Network, Mar. 2011 (7 pages).
Seagate Technology, How to Protect Data and Reduce Drive Retirement Costs, 2008 (15 pages).
Wang et al., International Appl. No. PCT/US11/22814 entitled Authenticate a Hypervisor With Encoded Information filed Jan. 28, 2011 (31 pages).
Wikipedia, HOTP, Jul. 2011 (4 pages).
Xen, How Does Xen Work?, Dec. 2009 (10 pages).

* cited by examiner

WEB-BASED INTERFACE TO ACCESS A FUNCTION OF A BASIC INPUT/OUTPUT SYSTEM

CROSS-REFERENCE TO RELATED APPLICATIONS

This is a continuation of U.S. application Ser. No. 14/352,424, filed Jun. 10, 2014, which is a national stage application under 35 U.S.C. §371 of PCT/US2011/057263, filed Oct. 21, 2011, which are both hereby incorporated by reference in their entirety.

BACKGROUND

An electronic device, such as a computer or other type of device, can include a Basic Input/Output System (BIOS) that is responsible for starting up the electronic device. During startup, the BIOS initializes and configures components of the electronic device, and loads an operating system in the electronic device. In addition, the BIOS can also provide other services, such as a power management service, a thermal management service, a BIOS update service, and so forth.

BRIEF DESCRIPTION OF THE DRAWINGS

Some embodiments are described with respect to the following figures.

DETAILED DESCRIPTION

A Basic Input/Output System (BIOS) is usually the first code executed by an electronic device when the electronic device starts. Examples of the electronic device include a computer (e.g. desktop computer, notebook computer, tablet computer, server computer, etc.), a handheld device (e.g. personal digital assistant, smartphone, etc.), an electronic appliance, a gaming console, or any other type of electronic device. The BIOS initializes and configures various hardware components of the electronic device, and loads and starts an operating system (OS) of the electronic device. Code for the BIOS is usually stored on a non-volatile memory, such as a flash memory device or other type of programmable read-only memory (ROM).

The BIOS also provides other functions that can be invoked in the electronic device. Many of such other functions of the BIOS are often executed in the electronic device by entering a system management mode (SMM), which is an operating mode in which OS execution is suspended. Also, in an electronic device having multiple processors or processor cores, all but one of the processors or processor cores may be disabled in SMM mode. To enter SMM mode, a system management interrupt (SMI) is asserted, and an SMI handler (which is part of the BIOS) is executed, often in a relatively high privilege mode, to perform the respective function(s).

There can be various issues with entering SMM mode to perform BIOS functions. First, because OS execution is suspended, normal electronic device operation cannot proceed. Also, in an electronic device in which processor(s) or processor core(s) are disabled during SMM mode, a part of the processing capacity of the electronic device is temporarily deactivated, which means that such part of the processing capacity is unavailable to perform other tasks. Moreover, it can be difficult to predict how long SMM processing may take, which can cause uncertainty in electronic device operation. Moreover, since certain BIOS functions can take a relatively long period of time to complete (e.g. on the order of minutes), status information may not be available to a user of the electronic device, which can result in a disconcerting experience to the user since the user is unable to ascertain whether the electronic device is functioning properly or not.

Security may also be an issue, since malware may attack during SMM operation, which can lead to system corruption. Security measures that are taken to avoid any such attacks against SMM operation can result in increased complexity in the design of an electronic device. Examples of such security measures include locking certain storage areas, including registers and/or a portion of non-volatile memory such as a flash memory device or other type of programmable read-only memory, which can provide protection against unwanted or unauthorized alteration of the BIOS. These security measures however, may impose constraints on the performance of certain BIOS functions, such as BIOS code update, which can force such BIOS functions to be performed only at certain times, such as system restart.

Examples of various functions that are often performed in SMM can include any one or a combination of the following: a service to update BIOS code; a service to access or modify a setting of the BIOS; a thermal management service to perform thermal management (e.g. control cooling devices such as fans in the electronic device); a power management service (removing or restoring power to specific hardware components); a service to transition the electronic device between different power states (e.g. hibernation state, sleep state, fully on state, and so forth); a service to process activation of a button or button sequence (that includes activation of some combination of multiple buttons) of the electronic device (e.g. a button to turn on/off a wireless interface component, a hot-key sequence to perform some predefined task, and so forth); a service associated with an ambient light sensor of the electronic device (for detecting ambient light around the electronic device); a service to modify a setting of the BIOS; a service to modify a setting of a hardware component in the electronic device; a service to change a boot order of bootable devices of the electronic device; a service for handling a certain type of call between the OS and the BIOS (e.g. an interrupt 15 call); a service to execute a command of an embedded controller; and a service to support a legacy peripheral device (e.g. a Universal Serial Bus device) under a certain condition.

Although various example BIOS functions are listed above, it is noted that other or alternative BIOS functions can be used in other implementations.

In accordance with some implementations, for more robust system behavior, functions of the BIOS can be provided in a domain that allows the BIOS functions to be accessible without the electronic device having to enter SMM mode. The domain can be located outside the electronic device, or the domain can be located inside the electronic device. Generally, the BIOS can be considered a "BIOS in a cloud," also referred to as "BIOS.v." The cloud can be located either in the electronic device or external of the electronic device.

Figure 1:
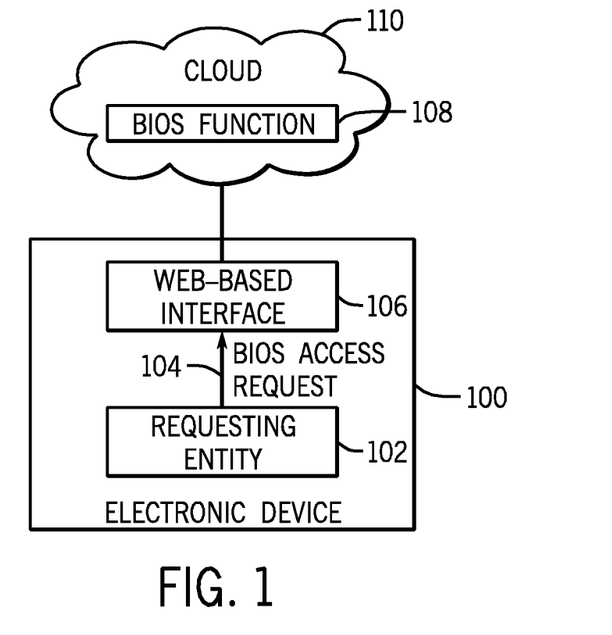
FIGS. 1, 3, 5, and 6 are block diagrams of arrangements according to various implementations.

To access the BIOS in a cloud, a web-based interface is provided. Generally, a "web-based interface" can refer to an interface that allows for a requestor to access a resource using messaging that is sent over a network, such as the Internet or other type of network. A web-based interface can provide a modern interface for accessing the BIOS, where the interface can be independent of or have less dependence upon the underlying platform, including an operating system and a chipset (discussed further below). FIG. 1 is a simplified block diagram of an electronic device 100, in accordance with some implementations. The electronic device 100 includes a requesting entity 102 (e.g. a virtual machine monitor, a guest virtual machine, or some other entity), which is able to submit a BIOS access request 104. The BIOS access request 104 is submitted to a web-based interface 106. A function that provides the web-based interface 106 is then able to direct the BIOS access request 104 to a corresponding BIOS function 108 in a cloud 110, where the cloud 110 can be internally in the electronic device 100, or in an external location accessible over a network. Although the ensuing discussion refers to "BIOS function" in the singular sense, it is noted that "BIOS function" can refer to a single BIOS function or multiple BIOS functions.

A virtual machine monitor (VMM), also referred to as a hypervisor, manages the sharing, by virtual machines, of the physical resources, including the hardware components, of the electronic device. The VMM virtualizes the physical resources. Each virtual machine has an associated virtualized physical resources managed by the VMM. The VMM processes requests for physical resources.

A "virtual machine" (also referred to as a "virtual appliance" or "virtual partition") refers to some partition or segment of a physical machine (the electronic device) that is provided to virtualize or emulate a physical machine. From the prospective of a user or application, a virtual machine looks like a physical machine. A virtual machine includes an operating system (referred to as a guest operating system) and at least one application program. A "guest virtual machine" can refer to a virtual machine that includes a guest operation system and an application. A guest virtual machine is different from a domain 0, which is often the first domain (or virtual machine) started by a virtual machine monitor.

As examples, the web-based interface 106 can be a web services interface. A web service refers to a mechanism designed to support interoperable machine-to-machine interaction over a network. Note that in some implementations, the web services interface can also allow for interaction between entities in the electronic device 100. The web services interface can be according to a format described by a Web Services Description Language (WSDL), as defined by the World Wide Web Consortium (W3C). Alternatively, the web services interface can be according to a Simple Object Access Protocol (SOAP) (also defined by the W3C), which is a protocol for exchanging structured information in the implementation of web services over networks.

As yet another alternative, the web-based interface 106 can be according to a Representational State Transfer (REST) architecture, which includes clients and servers, where clients can submit requests to servers, and servers can provide responses to clients. Requests and responses are built around the transfer of representations of resources. A resource can be any coherent and meaningful concept that may be addressed. A representation of a resource is typically a document that captures the current or intended state of a resource. In the REST architecture, a request submitted by a client can be a Hypertext Transfer Protocol (HTTP) Get request, in some examples. The server can provide an HTTP response to the HTTP Get request. Note that the client and server can be coupled over a network, or alternatively, the client and server can be inside the electronic device 100.

In the web-based interface 106, a resource (e.g. an internal BIOS function or external BIOS function) can be accessed by issuing a BIOS access request that contains an address of the requested resource. The address can be a web address, such as a Uniform Resource Locator (URL), an Internet Protocol (IP) address, or some other address that can uniquely identify the requested resource.

In response to the BIOS access request containing the address that is received at the web-based interface 106, the request can be directed to an appropriate one of the internal and external BIOS functions. In some cases, the request can be directed to both the internal and external BIOS functions.

Provision of a BIOS function at an external location can provide certain benefits. For example, a service provider associated with an external server computer can perform automatic checks of BIOS updates without involving client devices such as the electronic device 100. The service provider can also control rollback of a BIOS to a previous version, such as upon detection of a fault or corruption. There can be other further services with respect to the BIOS that can be performed at the external server computer in a more efficient and effective manner.

Another benefit of providing a web-based interface is that there can be reduced dependency on the specific chipset or operating system architecture for communications involved in accessing BIOS functionality. For example, in some systems that employ a WINDOWS® operating system from Microsoft, a WMI (Windows Management Instrumentation) mechanism, which is an implementation of WBEM (Web Based Enterprise Management), can be used for accessing BIOS functions from the operating system. However, support for WMI may not be available or may be sparse in other operating environments, such as environments using the Linux or other operating systems. As further examples, specific interrupt mechanisms, such as int15 or int1A, can be used with specific types of chipsets. Using a more open interface, such as a web-based interface according to some implementations, reduces dependency on specific chipset and operating system architectures. Furthermore, the command format for accessing BIOS functions using WMI or other schemes mentioned above can be archaic and may lack flexibility. A web-based interface allows use of commands according to more widely used standards, such as XML (Extensible Markup Language) or other standards, for communications to invoke BIOS functionality, which can allow for more open and extensible command formats, and which allows standards based validation mechanisms (e.g. XML-based validation mechanisms) to be employed.

Figure 2:
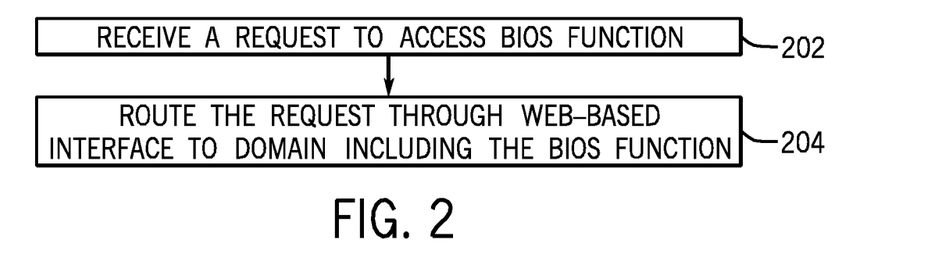
FIGS. 2 and 4 are flow diagrams of processes according to various implementations.

FIG. 2 is a flow diagram of a process according to some implementations. The process can be performed by the electronic device 100. The process receives (at 202) a request to access a BIOS function. The request can be received by a web-based interface (e.g. 106). The process then routes (at 204) the request through the web-based interface 106 to the cloud 110 that includes the BIOS function 108.

In some implementations, the cloud 110 in which the BIOS function 108 is provided is a privileged domain of the electronic device 100, where the privileged domain is a domain of the electronic device that is relatively secure and that has certain predefined privilege(s) not available to other entities in the electronic device. Generally, a "privileged domain" refers to a domain that has predefined privilege(s) that allows an entity in the domain to perform functions in the electronic device that other entities (e.g. OS, application programs, etc.) are not allowed to perform. Also, a privileged domain also has a security mechanism to protect the privileged domain from unauthorized access or attack.

By moving functions of the BIOS to the privileged domain, the electronic device 100 may not have to enter SMM mode to perform such BIOS functions that have been moved into the privileged domain. In some implementations, SMM operation can be eliminated altogether. In other implementations, SMM operation can still be enabled to perform certain BIOS functions, while the remaining BIOS functions are performed through the privileged domain. In the latter case, the idea is that SMM is enabled for just a small group of BIOS functions, such that effective measures can be taken to provide security and/or improve efficiency.

Examples of a privileged domain include any or some combination of the following: domain 0, which is often the first domain started by a virtual machine monitor (also referred to as a hypervisor) to perform management tasks; a portion of the virtual machine monitor (or hypervisor); a guest virtual machine that has predefined settings to provide the guest virtual machine with enhanced privileges and/or security; or another type of domain in the electronic device with a predefined special privilege and/or security mechanism.

Figure 3:
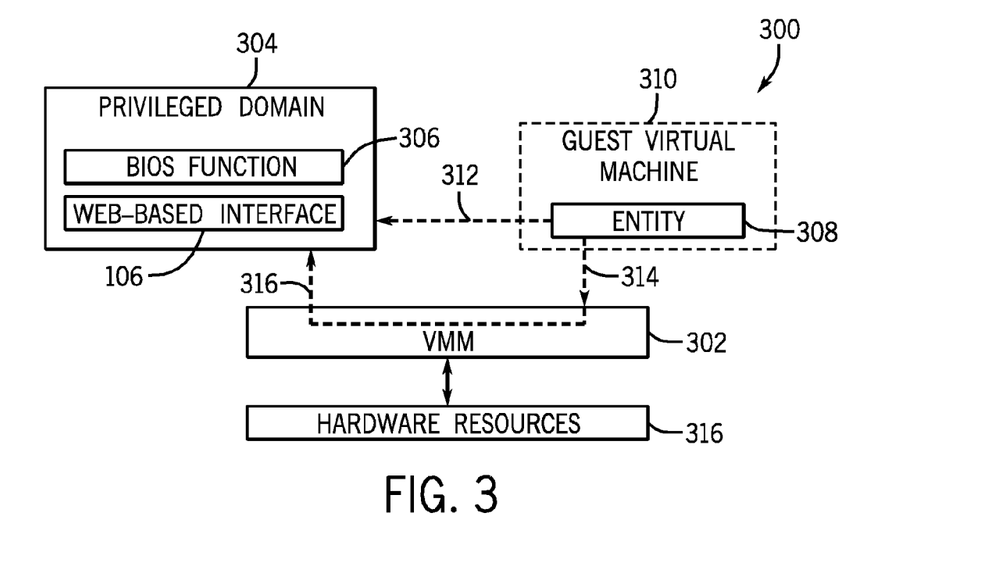

FIG. 3 is a block diagram of an example electronic device 300, according to some implementations. The electronic device 300 includes a VMM 302, which creates a privileged domain 304 that includes at least one BIOS function 306 (any one or combination of the BIOS functions listed above, or other BIOS functions). The privileged domain 304 also includes the web-based interface 106 of FIG. 1. The BIOS function 306 in the privileged domain 304 can be accessed through the web-based interface 106.

In some examples, the privileged domain 304 is domain 0, which is an administrative domain started by the VMM 302 upon system startup, and which has enhanced privileges and security mechanisms. Examples of tasks performed by domain 0 include creating and configuring guest domains. Each of domain 0 and guest domains is considered a corresponding virtual machine.

In other implementations, the privileged domain 304 can be another type of virtual machine, such as a guest virtual machine. The privileged domain 304 can be separate from the VMM 302, such as according to the FIG. 3 arrangement. In alternative implementations, the privileged domain 304 can be part of the VMM 302. In such alternative implementations, the BIOS function 306 and the web-based interface 106 is part of the VMM 302.

The BIOS function 306 is accessible by an entity 308 in the electronic device 300. In some examples, the entity 308 that is able to access the BIOS function 306 in the privileged domain 304 is part of a guest virtual machine 310. For example, such entity 308 can be a guest operating system or another type of entity in the guest virtual machine 310. In other examples, the entity 308 can be external of any guest virtual machine 310, such as in scenarios where a host operating system (not shown in FIG. 3) or an application program desires to access the BIOS function 306. A "host operating system" differs from a "guest operating system" in that a guest operating system is part of a virtual machine, whereas a host operating system is not part of a virtual machine.

There are two alternative mechanisms for the entity 308 to access the BIOS function 306 in the privileged domain 304. A first mechanism involves the entity 308 directly sending a request (312) to the web-based interface 106 to access the BIOS function 306 in the privileged domain 304.

As discussed further below, this can be enabled by the presence of a virtual BIOS in the guest virtual machine 310.

According to a second mechanism, a request (314) to access the BIOS function 306 is intercepted by the VMM 302, and routed by the VMM 302 (along path 316) to the web-based interface 106 in the privileged domain 304. In some implementations, the VMM 302 is able to intercept and route a request to access the BIOS function 306 (from the entity 308) to the privileged domain 304 without having to configure the VMM 302 with a virtual BIOS. This reduces complexity in the design of the VMM 302.

FIG. 3 also shows hardware resources 316 in the electronic device 300. As examples, the hardware resources 316 include a processor (or multiple processors), I/O devices, volatile memory, secondary storage, flash memory, a network interface controller, a graphics adapter, and so forth. Access of the hardware resources 316 by guest virtual machines (such as 310) is managed by the VMM 302.

Figure 4:
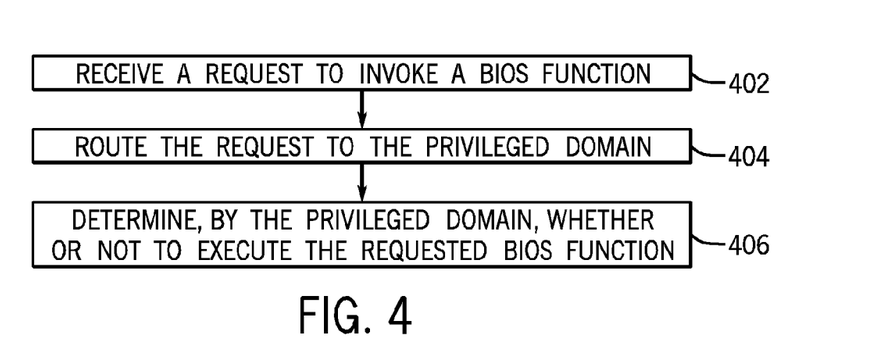

FIG. 4 is a flow diagram of a process according to some implementations. The process of FIG. 4 can be performed by entities depicted in FIG. 3, for example. The process receives (at 402) a request to invoke a function of the BIOS (e.g. BIOS function 306 in FIG. 1 or 3). This request can be received by the VMM 302 from the entity 308, for example.

The process routes (at 404) the request to the privileged domain 304. Such routing can be performed by the VMM 302, or alternatively, the routing can be performed by a virtual BIOS in the guest virtual machine 310. In implementations with a virtual BIOS, an entity (e.g. 308), which can be a guest operating system, in the guest virtual machine 310 that wishes to access a BIOS (such as the BIOS function 306) issues the access request to the virtual BIOS in the guest virtual machine 310. The virtual BIOS then routes the access request to the privileged domain 304.

The privileged domain 304 then determines (at 406) whether or not to execute the requested BIOS function based on identifying a source of the request, or identifying a context of the request, or identifying both the source and context of the request. In implementations where the privileged domain makes the determination (406) based on identifying the source of the request, then if the privileged domain 304 determines that the source of the request is authorized to access the requested BIOS function, the requested BIOS function is executed. On the other hand, in such implementations, if the privileged domain 304 determines that the source of the request is not authorized to access the requested BIOS function (such as in a scenario where malware has issued the request), then the privileged domain 304 can deny access of the requested BIOS function. In this manner, the privileged domain 304 is able to securely execute the BIOS function.

Alternatively or additionally, the privileged domain 304 makes the determination (406) based on identifying the context of the request. The "context" of the request refers to the current state or environment of the electronic device (or a portion of the electronic device) at the time the request is to be processed. The privileged domain 304 determines whether the request can be executed based on whether the request is contextually correct (in other words, based on whether the current state or environment of the electronic device (or electronic device portion) satisfies a rule or rules for execution of the request). For example, assume that the electronic device can legally proceed, in sequence, from state S1, to state S2, to state S3, and to state S4. Also assume that executing the requested BIOS function would place the electronic device in state S4. In such an example, the privileged domain 304 would allow the request to execute the BIOS function only if the electronic device is in state S3 (in other words, the context of the request is correct). On the other hand, if the electronic device were in state S2, then the privileged domain 304 would not allow execution of the request, since that would be an illegal transition (the context is incorrect).

Another example of whether the context of a request to execute a BIOS function is correct or not is as follows. Assume the system provides that a command to perform an action involves the following sequence of commands: (1) Lock System, (2) Perform Action, and (3) Unlock System. The request to execute the BIOS function would be contextually correct if the request were received for execution after a command to lock the system. However, if the request were received prior to receiving the command to lock the system, then the request would be contextually incorrect, and the request cannot be executed by the privileged domain.

In accordance with some implementations, the requested BIOS function is performed without having to enter SMM—in other words, SMM can be bypassed to perform certain BIOS function(s) which are traditionally performed in SMM by SMI BIOS handlers. By using techniques or mechanisms according to some implementations, the BIOS functions that traditionally would be performed in SMM can be instead performed in a trusted runtime environment provided by a privileged domain.

Additionally, overall design of an electronic device can be simplified since security mechanisms traditionally used, such as locking of registers or portions of non-volatile memory, can be omitted, since it is the privileged domain that now controls whether a request to a BIOS function is allowed to proceed.

In addition to executing the requested BIOS function, the privileged domain 304 is also able to perform certain tasks prior to execution of the BIOS function. As examples, the privileged domain 304 can determine if a request to access or perform a BIOS function is properly formed, or if the data to be written (such as in the case of BIOS code update) or a setting of a BIOS policy is correct (e.g. correct size, correct verification code, etc.). This can provide protections against cases where malware can use a malformed request to access BIOS functions, in an attempt to cause BIOS malfunctions as a result of processing the malformed command request. The privileged domain 304 can also determine if a backup of data to be modified (e.g. BIOS code) can be performed prior to performing the BIOS function. The privileged domain 304 can further determine if there is sufficient battery charge to complete the requested BIOS function. In general, the privileged domain can first validate a request to invoke a BIOS function inputs associated with the request, and a context of the request and its input, before the privileged domain begins to actually process or route the request to the actual physical BIOS for further processing.

In the context of updating BIOS code, the privileged domain 304 is also able to handle metadata and/or metacode associated with the BIOS update. The metadata can provide policies or descriptions regarding what part(s) of the BIOS code is to be updated, and condition(s) associated with performing the update (such as a condition relating to ensuring that an update code image for updating the BIOS code has a correct signature, a condition relating to rollback to an older BIOS code version in case of update failure, and so forth). The metacode can define procedure(s) regarding how variables and settings of the BIOS are to be updated. The privileged domain 304 can implement an interpreter to handle the metadata and/or metacode.

Figure 5:
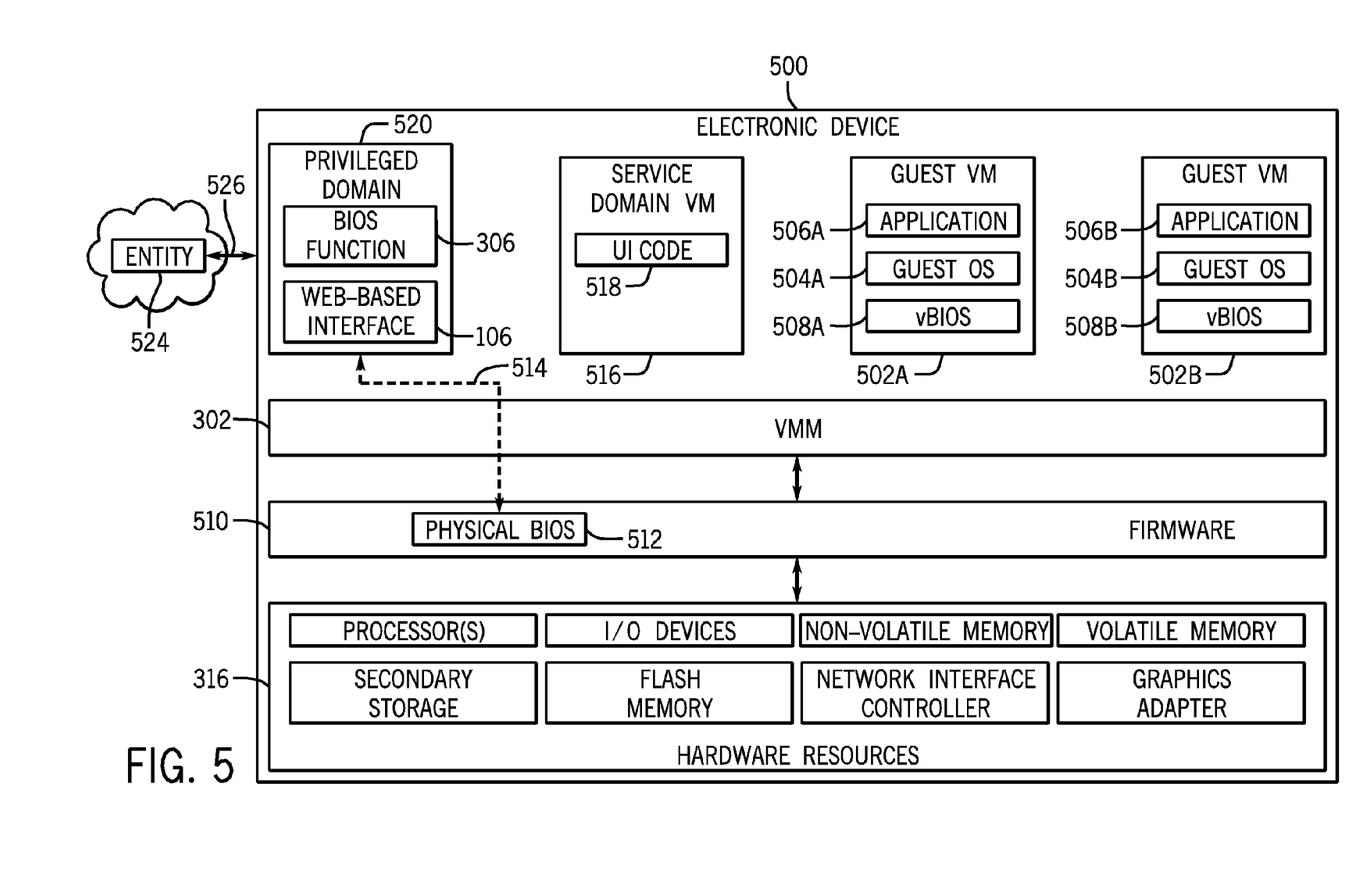

FIG. 5 is a block diagram of an electronic device 500 according to alternative implementations. The electronic device 500 includes multiple guest virtual machines 502A, 502B—although two virtual machines 502A, 502B are shown in FIG. 5, it is noted that in alternative implementations, there can be just one guest virtual machine or there can be more than two guest virtual machines.

Each guest virtual machine 502A or 502B includes a respective guest operating system 504A or 504B, as well as a respective application program 506A or 506B. In some implementations, each guest virtual machine 502A or 502B further includes virtual BIOS 508A or 508B. A guest operating system 504A or 504B designed to access services of a BIOS would make a call to the respective virtual BIOS 508A or 508B (instead of an actual BIOS). In some implementations, the virtual BIOS 508A or 508B can then directly route this request to a privileged domain 520, which includes the BIOS function 306. As with implementations according to FIG. 3, the privileged domain 520 can be implemented with domain 0 or another virtual machine, or can be implemented in the VMM 302.

In alternative implementations, the virtual BIOS 508A or 508B can instead route the request to access a BIOS function through the VMM 302. In yet further alternative implementations, the virtual BIOS 508A or 508B can be omitted from the guest virtual machine 502A or 502B—in such implementations, a request to access a BIOS function can be intercepted by the VMM 302.

The electronic device 500 further includes hardware resources 316 and a firmware layer 510 that has machine-readable instructions including an actual BIOS 512 (referred to as a "physical BIOS" in the ensuing discussion). A "physical BIOS" or "actual BIOS" refers to BIOS code that resides in non-volatile memory such as flash memory or other programmable read/only memory, and which is to be executed upon startup of the electronic device 500. The physical BIOS 512 can be a reduced (simplified) version of a typical physical BIOS, since one or multiple functions of the BIOS may have been moved to the privileged domain 520, such that these functions are executed from the privileged domain 520 so that access of the physical BIOS 512 does not have to be performed. However, there are certain functions of the physical BIOS 512 that remain with the physical BIOS 512—access of such BIOS functions involves invoking the physical BIOS 512. Such invocation can be accomplished from the privileged domain 104 through the VMM 302, as indicated by the path 514 in FIG. 5.

Also note that traditionally, data exchanged between an operating system and the BIOS is not protected, and as a result, some systems may employ various proprietary schemes to provide some level of protection for data exchanged between the operating system and the BIOS. Such protection is performed because the data transferred between an operating system and the BIOS can include sensitive information such as a user name, a password, an authentication hash, and/or an authentication policy. One example general protection scheme used is to encrypt the information exchanged between the operating system and the BIOS. Since protection using encryption would involve use and storage of a key in the BIOS (and the operating system), and because there are usually insufficient protection for this key, the protection afforded the information exchanged between the operating system and BIOS can be weak. Since communication with the physical BIOS 512 is performed through the privileged domain 520, traditional mechanisms for protecting the confidentiality and/or integrity of data (such as by encrypting the data) communicated with the physical BIOS 512 would not have to be implemented. This provides simplicity and performance enhancements in the solution while providing higher protection for data communicated to the physical BIOS without actually having to provide specific proprietary protection mechanisms.

In addition to the guest virtual machines 502A and 502B and the privileged domain 520, the electronic device 500 can also include a service domain virtual machine 516 that includes user interface (UI) code 518 executable to provide a user interface. The user interface provided by the UI code 518 in the service domain virtual machine 516 can be used by a user to monitor a status of the privileged domain 520, such that the user can be provided with feedback during execution of the BIOS function 306. Also, the user interface can be used to configure settings of the privileged domain 520.

As further depicted in FIG. 5, the privileged domain 520 also includes the web-based interface 106 to allow access of the BIOS function 306 in the privileged domain 520. The access of the BIOS function 306 can be from an entity in the electronic device 500. In further examples, the web-based interface 106 allows web access from an entity 524 that is external of the electronic device 500 over a secure connection 526. A "secure connection" refers to a network connection in which a security mechanism is applied (e.g. encryption of data, establishment of a secure tunnel, etc.) to prevent unauthorized access of the data communicated over the network connection. For example, in an enterprise environment (where an enterprise can be a business, educational organization, or government agency), the secure connection 526 allows the electronic device 500 to establish communication with a trusted server (524), such as a server configured to provide predefined services. An example of the predefined services that can be provided by the server 524 can include a service to update the physical BIOS 512 or the BIOS function 306. In other examples, other services can be provided by the server 524. The use of the trusted privileged domain 520 allows calls of a BIOS function to originate from outside the electronic device 500.

In some implementations, BIOS in a cloud is based on the following premises of a VMM-based architecture: the physical BIOS knows and trusts the main runtime entity (VMM 302 in FIG. 3 or 5) that the physical BIOS is booting, and the BIOS-trusted VMM has the ability to trap and turn off all I/O requests (to access BIOS functionality) other than those coming from the privileged domain. In some implementations, a BIOS verification mechanism can be provided to authenticate the origin of the VMM that is to be booted by the electronic device. Examples of such a verification mechanism are described in U.S. Patent Application No. PCT/US2011/022814. Such verification mechanisms allow an administrator or other user to specify that only an authorized VMM can be booted in the electronic device 100 or 300. The verification mechanism assures that the VMM image that is in the electronic device has not been modified maliciously, and that the VMM can be trusted. The physical BIOS can visually verify the VMM image, and ensure that the VMM is booted with a known set of controlled operational settings that have previously been specified.

After verifying that an authorized VMM has been booted, the physical BIOS can then defer or omit execution of various security measures that the physical BIOS would normally perform to prevent corruption by unauthorized or malicious code. For example, the physical BIOS can choose to not lock BIOS flash registers and/or portions of flash memory.

FIGS. 3 and 5 depict implementations in which the BIOS in the cloud (e.g. the BIOS function 306) is provided internally in an electronic device (300 or 500). Note, however, that from the perspective of a guest virtual machine or other entity of the electronic device that wishes to access BIOS services, the cloud including the BIOS services can be located anywhere, including in a location that is external of the electronic device.

Figure 6:
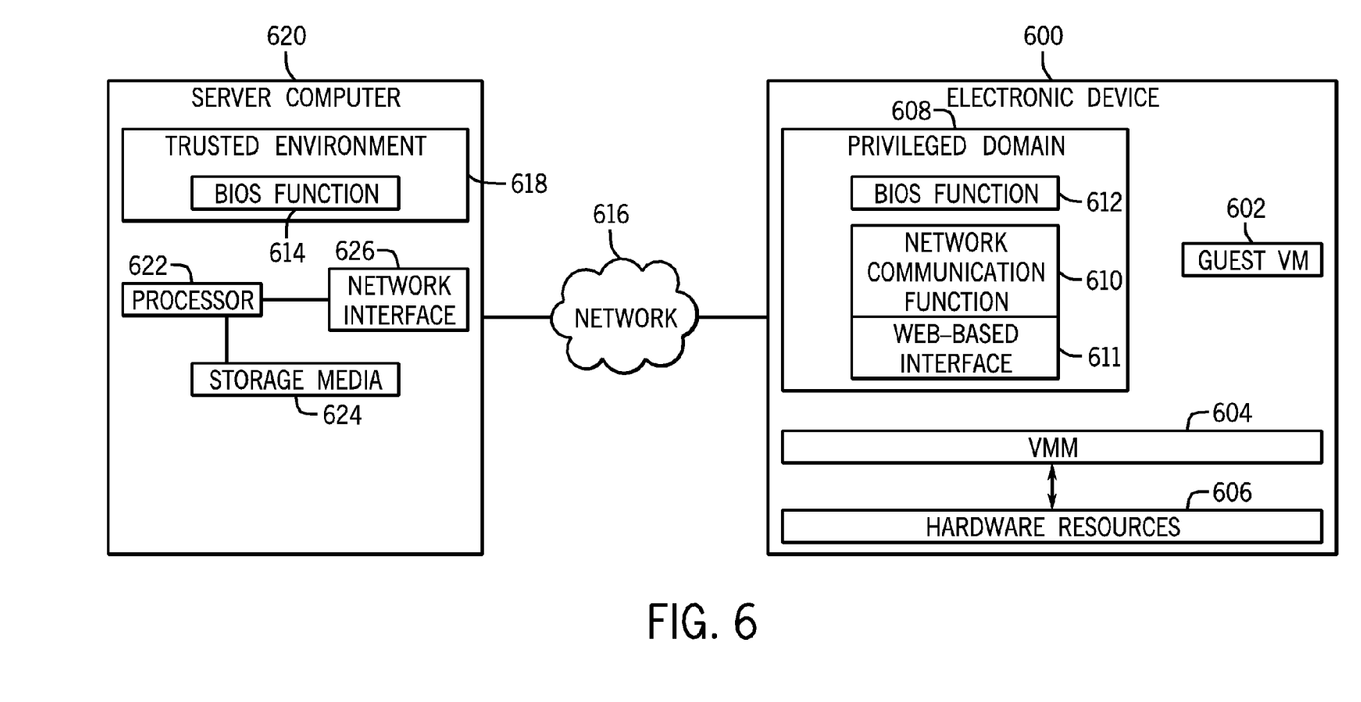

FIG. 6 shows an example of such an arrangement. FIG. 6 depicts an electronic device 600 that has a guest virtual machine 602, a VMM 604, and hardware resources 606. The electronic device 600 further includes a privileged domain 608 that has a web-based network communication function 610. The web-based network communication function 610 provides a web-based interface 611 that is able to route a BIOS access request to either an internal BIOS function 612 (which can be part of the privileged domain 608) or an external BIOS function 614 (which is accessible over a network 616). A requesting entity (e.g. the VMM 604 or guest virtual machine 602) can submit a BIOS access request to the web-based interface 611 provided by the web-based network communication function 610.

In some implementations, the network 616 is a secure network implemented with a secure mechanism to prevent unauthorized access of information communicated between network elements over the network 616.

The external BIOS function 614 can be part of a trusted environment 618 in a server computer 620. In some implementations, the trusted environment 618 can also be implemented in a privileged domain (e.g. domain 0, secure guest virtual machine, virtual machine monitor, etc.) in the server computer 620. The server computer 620 has one or multiple processors 622, storage media 624, and a network interface 626 to communicate over the network 616 with the electronic device 600.

Various modules, such as those depicted in FIGS. 1, 3, 5, and 6, can be implemented as machine-readable instructions that can be executed on one or multiple processors. A processor can include a microprocessor, microcontroller, processor module or subsystem, programmable integrated circuit, programmable gate array, or another control or computing device.

The machine-readable instructions can be stored in machine-readable or computer-readable storage media, which can be implemented as one or multiple computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A non-transitory machine-readable storage medium storing instructions that upon execution cause an electronic device, comprising to:
   receive, while an operating system is running in the electronic device, a request to access a function of a Basic Input/Output System (BIOS), the request containing a web address of the function of the BIOS; and
   route, based on the web address of the function of the BIOS, the request through a web-based interface to a domain that includes the function of the BIOS.

2. The non-transitory machine-readable storage medium of claim 1, wherein routing the request to the domain comprises routing the request to the domain that is inside the electronic device.

3. The non-transitory machine-readable storage medium of claim 1, wherein routing the request to the domain comprises routing the request to a privileged domain started by a virtual machine monitor (VMM).

4. The non-transitory machine-readable storage medium of claim 3, wherein the request is received from an entity executing in a virtual machine in the electronic device.

5. The non-transitory machine-readable storage medium of claim 4, wherein the entity is the operating system.

6. The non-transitory machine-readable storage medium of claim 4, wherein the instructions upon execution cause the electronic device to further:
   send, by a virtual BIOS in the virtual machine, the request from the entity to the web-based interface.

7. The non-transitory machine-readable storage medium of claim 3, wherein the instructions upon execution cause the electronic device to further:
   intercept, by the VMM, the request; and
   route, by the VIM, the request to the web-based interface.

8. The non-transitory machine-readable storage medium of claim 1, wherein routing the request to the domain comprises routing the request to the domain that is outside the electronic device, wherein the domain is accessible by the electronic device over a network.

9. The non-transitory machine-readable storage medium of claim 1, wherein the web address comprises a uniform resource locator (URL) or an Internet Protocol (IP) address.

10. The non-transitory machine-readable storage medium of claim 1, wherein the instructions upon execution cause the electronic device to further determine, by the domain, whether to execute the function based on identifying at least one selected from among a source of the request and a context of the request.

11. The non-transitory machine-readable storage medium of claim 1, wherein receiving the request to access the function of the BIOS comprises receiving the request to invoke a service selected from the group consisting of:
   a service to update code of the BIOS;
   a service to update a setting of the BIOS;
   a thermal management service to perform thermal management in the electronic device;
   a service to transition the electronic device between different power states;
   a power management service to control power of a component in the electronic device;
   a service to process activation of a button or button sequence of the electronic device;
   a service associated with an ambient light sensor of the electronic device;
   a service to modify a setting of a hardware component in the electronic device;
   a service to change a boot order of bootable devices of the electronic device;
   a service for handling a call between an operating system and the BIOS; and
   a service to execute a command of an embedded controller.

12. An electronic device comprising:
   a web-based interface;
   at least one processor; and
   an operating system executable on the at least one processor to submit a request to the web-based interface for accessing a function of a Basic Input/Output System (BIOS) in a cloud, the request containing a web address of the function of the BIOS,
   the web-based interface to route, based on the web address, the request to the function of the BIOS in the cloud.

13. The electronic device of claim 12, further comprising a virtual machine monitor (VMM) and a domain started by the VMM, wherein the domain includes the function of the BIOS in the cloud, and wherein the web-based interface is to forward the request to the domain.

14. The electronic device of claim 12, wherein the web-based interface is to forward the request to a domain outside the electronic device, the domain including the function of the BIOS in the cloud.

15. The electronic device of claim 12, wherein the web-based interface is to receive a request from an entity outside the electronic device to perform a service with respect to the BIOS.

16. The electronic device of claim 12, wherein the web address is a uniform resource locator (URL) or an Internet Protocol (IP) address.

17. A method of an electronic device, comprising:
   receiving, while an operating system is running in the electronic device, a request to access a function of a Basic Input/Output System (BIOS), the request containing a web address of the function of the BIOS; and
   route, based on the web address of the function of the BIOS, the request through a web-based interface to a domain that includes the function of the BIOS.

18. The method of claim 17, wherein the web address is a uniform resource locator (URL) or an Internet Protocol (IP) address.

19. The method of claim 17, wherein the request is received from the operating system executing in a virtual machine in the electronic device.

20. The method of claim 19, wherein the domain is started by a virtual machine monitor (VMM).

* * * * *

UNITED STATES PATENT AND TRADEMARK OFFICE
CERTIFICATE OF CORRECTION

PATENT NO. : 9,753,742 B2  Page 1 of 1
APPLICATION NO. : 15/263804
DATED : September 5, 2017
INVENTOR(S) : Valiuddin Y. Ali et al.

It is certified that error appears in the above-identified patent and that said Letters Patent is hereby corrected as shown below:

On the Title Page

In item (72), Inventors, in Column 1, Line 4, delete "Lyons" and insert -- Lyon --, therefor.

In the Claims

In Column 11, Line 46, in Claim 7, delete "VIM," and insert -- VMM, --, therefor.

Signed and Sealed this
Thirtieth Day of January, 2018

Joseph Matal
*Performing the Functions and Duties of the
Under Secretary of Commerce for Intellectual Property and
Director of the United States Patent and Trademark Office*